(12) United States Patent
Glenn

(10) Patent No.: US 7,513,274 B1
(45) Date of Patent: Apr. 7, 2009

(54) INFLATABLE PLUMBING TEST PLUG AND METHOD

(76) Inventor: William F. Glenn, 1574 Coburg Rd., #380, Eugene, OR (US) 97401-4802

( * ) Notice: Subject to any disclaimer, the term of this patent is extended or adjusted under 35 U.S.C. 154(b) by 0 days.

(21) Appl. No.: 12/218,610

(22) Filed: Jul. 15, 2008

Related U.S. Application Data

(63) Continuation-in-part of application No. 12/001,699, filed on Dec. 11, 2007, now abandoned.

(60) Provisional application No. 60/874,691, filed on Dec. 12, 2006.

(51) Int. Cl.
*F16L 55/10* (2006.01)
(52) U.S. Cl. .............................. 138/90; 138/91; 138/93
(58) Field of Classification Search .................. 138/90, 138/91, 93
See application file for complete search history.

(56) References Cited

U.S. PATENT DOCUMENTS

| | | | | |
|---|---|---|---|---|
| 3,431,945 A | | 3/1969 | Robillard | |
| 4,122,869 A | * | 10/1978 | Roberson, Sr. | 138/93 |
| 4,417,598 A | * | 11/1983 | DePirro | 137/2 |
| 4,565,222 A | * | 1/1986 | Lundman | 138/93 |
| 4,660,603 A | * | 4/1987 | Tash | 138/92 |
| 5,234,034 A | | 8/1993 | Lyon | |
| 6,116,286 A | * | 9/2000 | Hooper et al. | 138/93 |
| 2005/0229985 A1 | * | 10/2005 | Saxenfelt | 138/93 |

* cited by examiner

*Primary Examiner*—James F Hook
(74) *Attorney, Agent, or Firm*—Robert E. Howard

(57) ABSTRACT

An inflatable test plug for insertion into a two way clean out during hydrostatic testing of a building's interior sewer pipes. The test plug includes a hollow cylindrical body portion having a closed top, and a closed bottom portion. The test plug is adapted to receive and hold air under pressure during an inflation phase and to release the air under pressure during a deflation phase. The cylindrical body portion and the closed bottom portion of the test plug body are adapted to expand during inflation. The closed bottom portion is adapted to expand prior to the cylindrical body portion during the inflation phase, and adapted to deflate prior to the cylindrical body portion during the deflation phase. The closed bottom portion has opposing locking indentations in its outer surface adapted to receive opposing inwardly extending projections located in the mid-portion of the two way clean out.

12 Claims, 2 Drawing Sheets

INFLATABLE PLUMBING TEST PLUG AND METHOD

CROSS-REFERENCE TO RELATED APPLICATIONS

This application is a continuation-in-part of application Ser. No. 12/001,699 filed Dec. 11, 2007 now abandoned. Application Ser. No. 12/001,699 claims the benefit of U.S. Provisional Application No. 60/874,691, filed Dec. 12, 2006. The entire contents of application Ser. No. 12/001,699 and U.S. Provisional Application No. 60/874,691 are hereby incorporated by reference.

BACKGROUND OF THE INVENTION

This invention relates to an inflatable plumbing test plug and method of using the inflatable plumbing test plug.

In every building under construction, the sewer pipes and associated fittings within the building must be tested for leaks during the rough phase of plumbing. This is accomplished by inserting an uninflated test plug into the two way clean out down to the sewer line, and inflating the test plug to block the sewer line. The sewer pipes within the building are then hydrostatically tested by filling them with water through the uppermost vent pipe to determine if there are any leaks. Upon completion of the hydrostatic test, the test plug is deflated and removed, and the water within the sewer pipes discharged into the sewer line.

The type of test plug most commonly used is an inflatable plug. An inflatable test plug of the type commonly in current use is described in U.S. Pat. No. 4,964,439.

Since the building drain line and sewer line are typically anywhere from two to five feet or more below grade, it is often difficult to get the test plug properly inserted into the sewer line through the two way clean out. In addition, prior test plugs are often forced downstream and lost due to the pressure from the water test.

An additional problem is encountered if the test shows that there are leaks in the sewer pipes and associated fittings inside the building. In such an eventuality the test plug must be withdrawn, the leaks repaired, and the system re-tested by reinserting the test plug and repeating the process, thus repeating the problem of proper insertion of the test plug into the sewer line.

SUMMARY OF THE INVENTION

It is an object of the invention to provide a test plug useful in testing sewer pipes located within a building for leaks that is easy to use.

The inflatable test plug of the present invention is adapted for insertion into a two way clean out. The two way clean out has a vertical leg and a horizontal leg, the horizontal leg having an upstream side adapted to be connected to a building's sewer drain and a downstream side adapted to be connected to a sewer pipe.

The inflatable test plug includes a hollow cylindrical body portion, a closed top, and a closed bottom portion. The test plug is adapted to receive and hold air under pressure during an inflation phase and to release the air under pressure during a deflation phase.

The closed bottom portion has opposing locking indentations in its outer surface adapted to receive opposing inwardly extending projections located in the mid-portion of a two way clean out.

The closed bottom portion is adapted to expand prior to expansion of the cylindrical body portion during the inflation phase. The closed bottom portion is adapted to deflate prior to the cylindrical body portion during the deflation phase.

The closed bottom portion is adapted to expand and block the upstream and downstream sides of the two way clean out when fully inflated by air under pressure.

The cylindrical body portion of the test plug body is adapted to expand and block the vertical leg of the two way clean out when fully inflated by air under pressure.

In the process of hydrostatic testing the interior sewer pipes of a building by using the test plug of the present invention, the test plug is inserted into the vertical leg of a two way clean out until its closed bottom portion is located between the upstream and downstream legs thereof.

The test plug is inflated by a source of compressed air so that said closed bottom portion thereof first expands and blocks the upstream and downstream sides of the two way clean out, and the cylindrical body portion of the wall is next inflated and blocks the vertical leg of the two way cut out.

The interior sewer lines of the building are subjected to hydrostatic testing to determine if leaks are present. Where leaks are present, sufficient air is removed from the test plug to cause the closed bottom portion thereof to deflate, but not sufficient to cause the cylindrical body portion of the test plug to deflate, thereby allowing water from the interior sewer lines to be evacuated to the sewer without having to remove the test plug from the two way clean out.

Any such leaks are repaired. The closed bottom portion of the test plug is then fully re-inflated to block the upstream and downstream sides of the horizontal leg of the two way clean out, and hydrostatic testing is repeated to determine if all leaks have been repaired.

DESCRIPTION OF PREFERRED EMBODIMENTS

Figure 1:
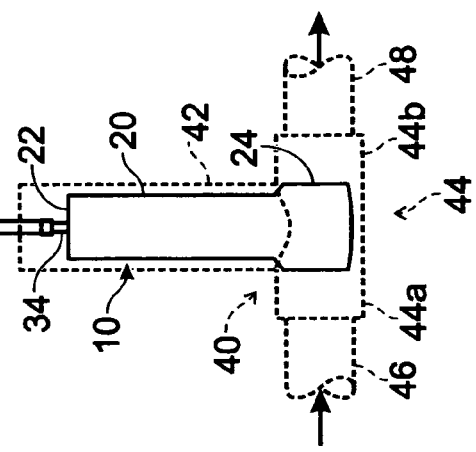
FIG. 1 is a side elevation view of the inflatable test plug of the present invention in its fully deflated configuration.

The inflatable test plug 10 includes a hollow cylindrical body portion 20 having a closed top 22, and a closed bottom portion 24 in communication therewith.

An air hose 30 communicates a compressed air source 32 with the interior of test plug 10 via valve stem 34.

The wall a-a' of cylindrical body portion 20 is formed of a stretchable elastomeric material, such as rubber or a synthetic elastomer, that has a wall thickness greater than the wall thickness of the wall b-b' of closed bottom portion 24. Spaced apart and parallel sealing members 21, 21' encircle cylindrical body portion 20 to aid in forming a seal. Sealing members 21, 21' can be O-rings seated in grooves encircling cylindrical body portion 20, or can be ribs formed integral with the wall of cylindrical body portion 20. Although two sealing members 21, 21' are preferred, a single sealing member or more than two sealing members could be used.

Closed bottom portion 24 is formed of a stretchable elastomeric material, such as rubber or a synthetic elastomer, that has a wall thickness b-b' less than that of the wall thickness a-a' of cylindrical body portion 20.

Figure 2:
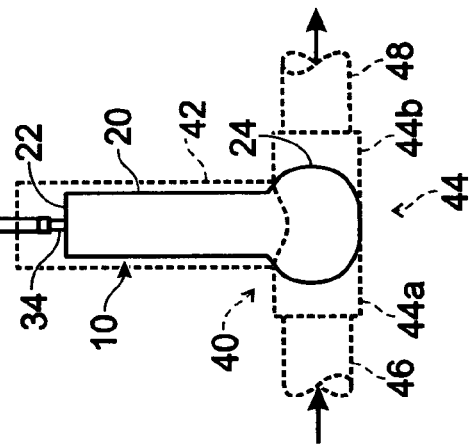
FIG. 2 is a side elevation view of the inflatable test plug of the present invention in its partially inflated configuration.
Figure 3:
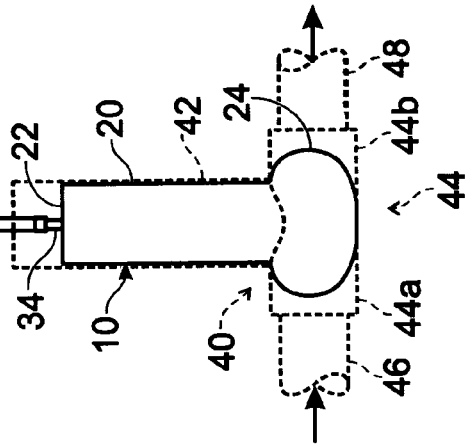
FIG. 3 is a side elevation view of the inflatable test plug of the present invention in its fully inflated configuration.

A typical two way clean out 40 located outside a building is shown in phantom in FIGS. 1-3. The two way clean out 40 includes a vertical leg 42 and a horizontal leg 44. The longitudinal axis of vertical leg 42 and the longitudinal axis of horizontal leg 44 are perpendicular to each other. The upstream side 44a of horizontal leg 44 is connected to the sewer drain line 46 of the building. The downstream side 44b of horizontal leg 44 is connected to sewer pipe 48 which ultimately connects to, for example, a municipal sewer line. An entry port 44c receives, and is attached to, vertical leg 42.

Figure 4:
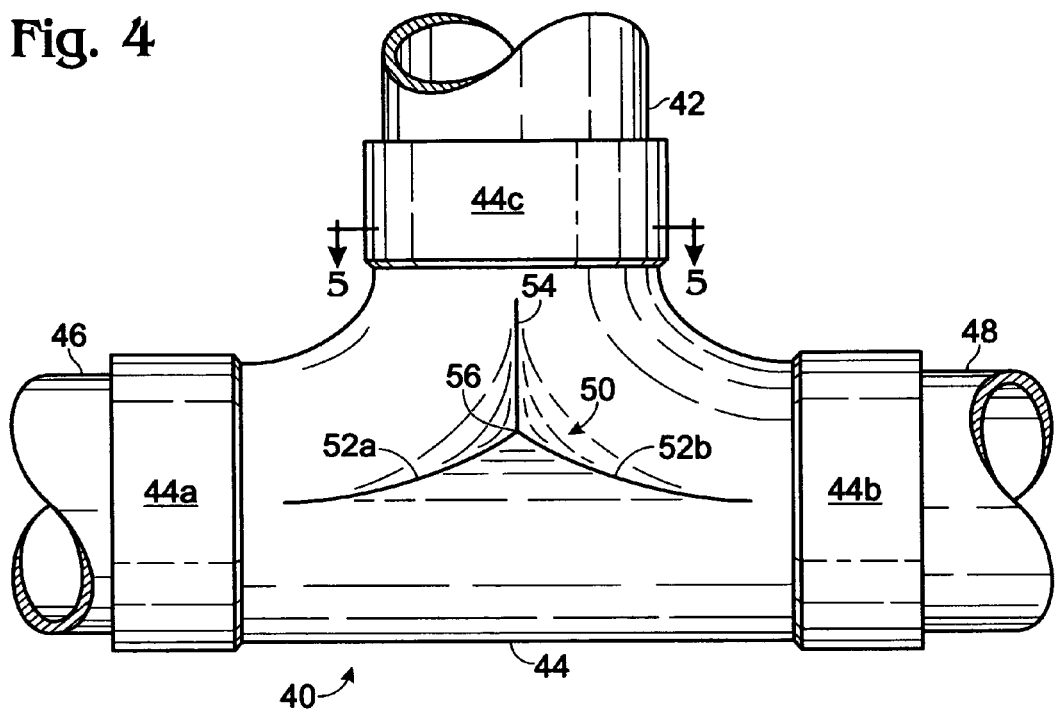
FIG. 4 is a side elevation view of a currently approved two way clean out.
Figure 5:
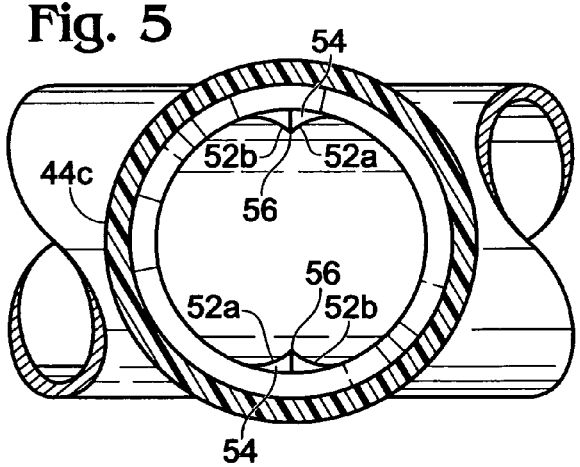
FIG. 5 is a view looking inside the two way clean out of FIG. 4 through the entry port to show the side wall indentations.

The only currently approved two way clean out is shown in detail in FIG. 4. This two way clean out 40 includes identical opposing indentations 50 which are located in the mid-portion of each side of horizontal leg 44, substantially 180 degrees apart. Each indentation 50 is formed by curved creases 52a and 52b, and vertical crease 54 which meet at an apex (vertex) 56.

Figure 6:
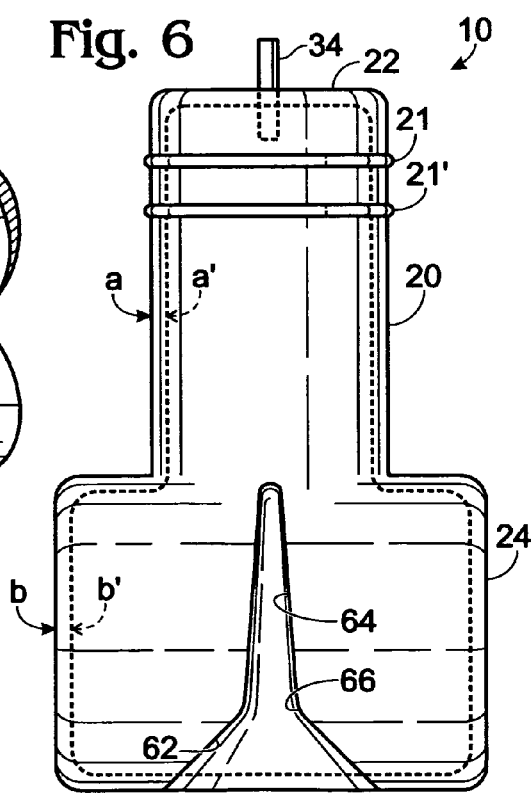
FIG. 6 is an enlarged side elevation view of the inflatable test plug in its fully deflated configuration.

It is preferred to form two identical locking indentations 60 in opposing surfaces of closed bottom portion 24 of inflatable test plug 10. By "opposing surfaces" it is intended to mean that the two locking indentation 60 (only one of which is shown in FIG. 6) are opposite each other, i.e., substantially 180 degrees apart. As seen in FIG. 6, locking indentation 60 is formed by an inverted V-shaped entry portion 62 located adjacent the bottom of closed bottom portion 24, and an elongated slot portion 64 extending upwardly from the apex 66 of said V-shaped portion 62.

In use, deflated test plug 10 is inserted into the vertical leg 42 of two way clean out 40 until its closed bottom portion 24 is located between the upstream and downstream legs 44a and 44b thereof, as shown in FIG. 1. During insertion, deflated test plug 10 is rotated back and forth until the apex 56 of indentation 50 of two way clean out 40 engages the inverted V-shaped slot portion 62 and is guided by the walls of V-shaped slot portion 62 into generally rectangular-shaped slot portion 64 to lock test plug 10 into position. Air from pressurized air source 32 is then admitted into the interior of deflated test plug 10 via valve 34. As the air pressure within test plug 10 increases, closed bottom portion 24 inflates into sealing contact with the interior wall both of the horizontal legs 44a and 44b, respectively, of horizontal leg 44 of two way clean out 40, as shown in FIG. 2. Further inflation causes the cylindrical body portion 20 to expand into sealing contact with the interior wall of vertical leg 42 of two way clean out 40. Once test plug 10 is fully inflated, as shown in FIG. 3, hydrostatic testing of the interior sewer pipes can be carried out.

If a leak or leaks are detected, test plug 10 is deflated via valve stem 34 to at least partially collapse closed bottom 24 to the position approximately shown in FIG. 2. Such deflation allows water to flow from sewer drain line 46 into sewer pipe 48 to thereby drain the interior sewer pipes and allow leaks to be repaired. Because the wall thickness of closed bottom portion 24 is less than the wall thickness of cylindrical body portion 20, such collapsing of closed bottom portion 24 allows cylindrical body portion 20 to remain in sealing contact with the interior wall of the vertical leg 42 of two way clean out 40, thereby preventing water from exiting vertical leg 42 of two way clean out 40. By only collapsing closed bottom portion 24, test plug 10 can be left within the two way clean out 40 during draining of the system, thereby obviating the need to remove it and replace it for further hydrostatic testing after repairs are effected. Since cylindrical body portion 20 remains in sealing contact with the interior wall of vertical leg 42 of two way clean out 40, test plug 10 cannot be dislodged by water flowing through horizontal leg 44.

The purpose of having the wall thickness b-b' of closed bottom portion 24 less than the wall thickness a-a' of cylindrical body portion 20 is to cause closed bottom portion 24 to inflate first during the inflation phase, and to deflate first during the deflation phase. Although having a difference in wall thickness can accomplish this goal, it can also be accomplished by using rubber or elastomeric materials for these sections that have a differing modulus of elasticity.

The cylindrical body portion 20 and closed bottom portion 24 can be joined together by any suitable means, such as by welding or by use of an appropriate adhesive.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An inflatable test plug for insertion into a two way clean out, said two way clean out having a horizontal leg having an upstream side adapted to be connected to a building's sewer drain and a downstream side adapted to be connected to a sewer pipe, said two way clean out having a clean out entry port in its mid-portion that is attached to a vertical clean out leg, said horizontal leg having opposing inwardly extending projections located at its mid-portion, comprising:

an inflatable hollow cylindrical body portion having a closed top, and an inflatable closed bottom portion communicating with the interior of said cylindrical body portion;

said closed bottom portion having opposing locking indentations located in its outer surface, said opposing locking indentations adapted to receive said opposing inwardly extending projections located in said mid-portion of said horizontal leg of said two way clean out;

valve means for introducing air under pressure into said test plug through said closed top of said cylindrical body portion and for releasing air from said test plug, said test plug adapted to receive and hold air under pressure during an inflation phase and to release said air under pressure during a deflation phase;

said closed bottom portion adapted to expand prior to said cylindrical body portion during said inflation phase, said closed bottom portion adapted to deflate prior to said cylindrical body portion during the deflation phase;

said closed bottom portion adapted to expand and block said upstream and downstream sides of said two way clean out when fully inflated by said air under pressure;

said cylindrical body portion of said wall adapted to expand and block said vertical leg of said two way clean out when fully inflated by said air under pressure.

2. The test plug of claim 1 wherein said inflatable hollow cylindrical body portion and said inflatable closed bottom portion are formed of a stretchable elastomeric material.

3. The test plug of claim 2 wherein said cylindrical body portion has a thickness greater than the thickness of said closed bottom portion.

4. The test plug of claim 1 wherein each of said opposing locking indentations located in said outer surface of said closed bottom portion is comprised of an inverted V-shaped entry portion adjacent the bottom of said closed bottom portion and an elongated slot portion extending upwardly from the apex of said inverted V-shaped portion.

5. The test plug of claim 1 wherein at least one sealing member encircles said cylindrical body portion.

6. The test plug of claim 5 wherein there are two, spaced apart and parallel sealing members.

7. The process of hydrostatic testing the interior sewer pipes of a building by inserting a test plug into a two way clean out, said two-way clean out having a vertical leg and a horizontal leg, said horizontal leg having an upstream side adapted to be connected to the building's sewer drain and a downstream side adapted to be connected to a sewer pipe, said two way clean out having a clean out entry port in its mid-portion that is attached to a vertical clean out leg, said horizontal leg and said vertical leg each having a longitudinal axis that are perpendicular to each other, said horizontal leg having opposing inwardly extending projections located at its mid-portion, comprising:

provide a test plug including a hollow cylindrical body portion having a closed top, and a closed bottom portion;

said closed bottom portion having opposing locking indentations located in its outer surface, said opposing grooves adapted to receive said opposing inwardly extending projections located in said mid-portion of said horizontal leg of said two way clean out;

said test plug including valve means for introducing air under pressure into said test plug through said closed top of said cylindrical body portion and for releasing air from said test plug, said test plug being adapted to receive and hold air under pressure during an inflation phase and to release said air under pressure during a deflation phase;

said closed bottom portion adapted to expand prior to said cylindrical body portion during said inflation phase, said closed bottom portion adapted to deflate prior to said cylindrical body portion during the deflation phase;

said closed bottom portion adapted to expand and block said upstream and downstream sides of said two way clean out when fully inflated by said air under pressure;

said cylindrical body portion adapted to expand and block said vertical leg of said two-way clean out when fully inflated by said air under pressure;

inserting said test plug into said vertical leg of said two way clean out and engaging said locking indentation with said opposing inwardly extending projections located at the mid-portion of said horizontal leg of said two way clean out;

continuing to insert said test plug until said closed bottom portion is located between said upstream and downstream legs of said horizontal leg of said two way clean out;

inflating said test plug until said closed bottom portion thereof has expanded and blocks said upstream and downstream sides of said two way clean out, and said cylindrical body portion has inflated and blocks said vertical leg of said two way cut out; and subjecting said interior sewer lines of said building to hydrostatic testing to determine if leaks are present.

8. The process of claim 7 wherein said inflatable hollow cylindrical body portion of said test plug and said inflatable closed bottom portion of said test plug are formed of a stretchable elastomeric material.

9. The process of claim 8 wherein said cylindrical body portion of said test plug has a thickness greater than the thickness of said closed bottom portion of said test plug.

10. The process of claim 7 wherein each of said opposing locking indentations located in said outer surface of said closed bottom portion is comprised of an inverted V-shaped entry portion located adjacent the bottom of said closed bottom portion and an elongated slot portion extending upwardly from the apex of said inverted V-shaped slot portion.

11. The process of claim 7 wherein at least one sealing member encircles said cylindrical body portion of said test plug.

12. The process of claim 11 wherein there are two, spaced apart and parallel sealing members.

* * * * *